(12) United States Patent
Omori et al.

(10) Patent No.: US 11,356,603 B2
(45) Date of Patent: Jun. 7, 2022

(54) IMAGE CAPTURING APPARATUS AND CONTROL METHOD THEREFOR

(71) Applicant: CANON KABUSHIKI KAISHA, Tokyo (JP)

(72) Inventors: Yuji Omori, Kawasaki (JP); Yasushi Ohwa, Tokyo (JP); Kazunori Takayama, Tokyo (JP); Minoru Sakaida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/866,637

(22) Filed: May 5, 2020

(65) Prior Publication Data
US 2020/0358949 A1 Nov. 12, 2020

(30) Foreign Application Priority Data
May 8, 2019 (JP) .............................. JP2019-088569

(51) Int. Cl.
*H04N 5/232* (2006.01)
(52) U.S. Cl.
CPC ..... *H04N 5/23227* (2018.08); *H04N 5/23245* (2013.01)
(58) Field of Classification Search
CPC ................. H04N 5/23227; H04N 5/23245
See application file for complete search history.

(56) References Cited

U.S. PATENT DOCUMENTS

| 7,324,136 B2 * | 1/2008 | Kubo ..................... H04N 5/772 348/220.1 |
| 2014/0071306 A1 * | 3/2014 | Kunishige .......... H04N 5/23245 348/220.1 |

FOREIGN PATENT DOCUMENTS

JP 2018-038088 A 3/2018

* cited by examiner

*Primary Examiner* — Timothy J Henn
*Assistant Examiner* — Fayez A Bhuiyan
(74) *Attorney, Agent, or Firm* — Cowan, Liebowitz & Latman, P.C.

(57) ABSTRACT

An image capturing apparatus comprising an image sensor and a control circuit is disclosed. The control circuit changes, if a second drive period that is a drive period of the image sensor for still image shooting overlaps with a first drive period that is a drive period of the image sensor for moving image shooting, a start timing of the second drive period. When performing still image shooting while performing moving image shooting and moving image display: if the still image shooting is single image shooting or a first shot of continuous shooting, the control circuit does not change the start timing of the second drive period. If the still image shooting is a second shot onward of continuous shooting, the control circuit changes the start timing of the second drive period with giving priority to the moving image display.

13 Claims, 6 Drawing Sheets

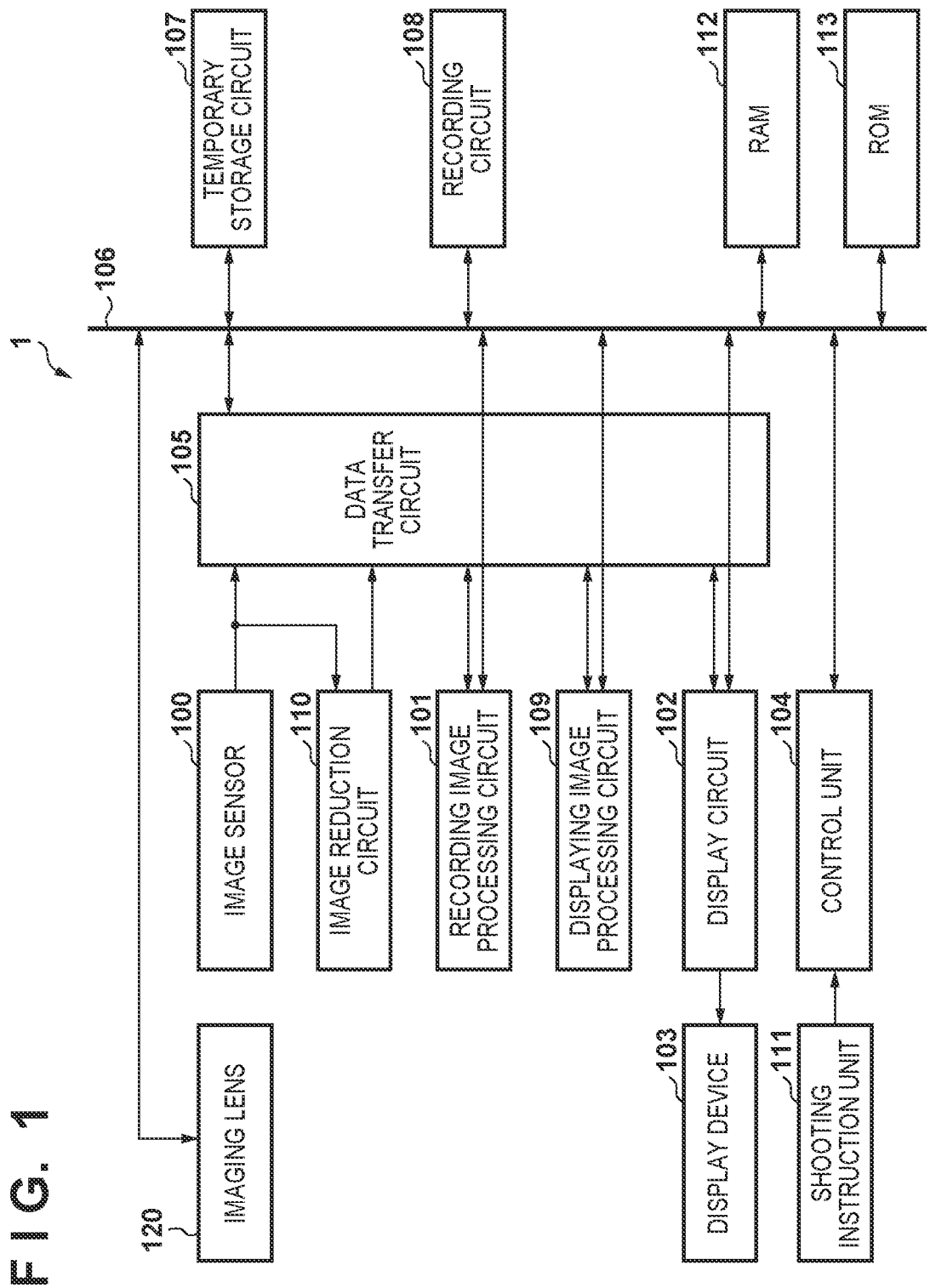

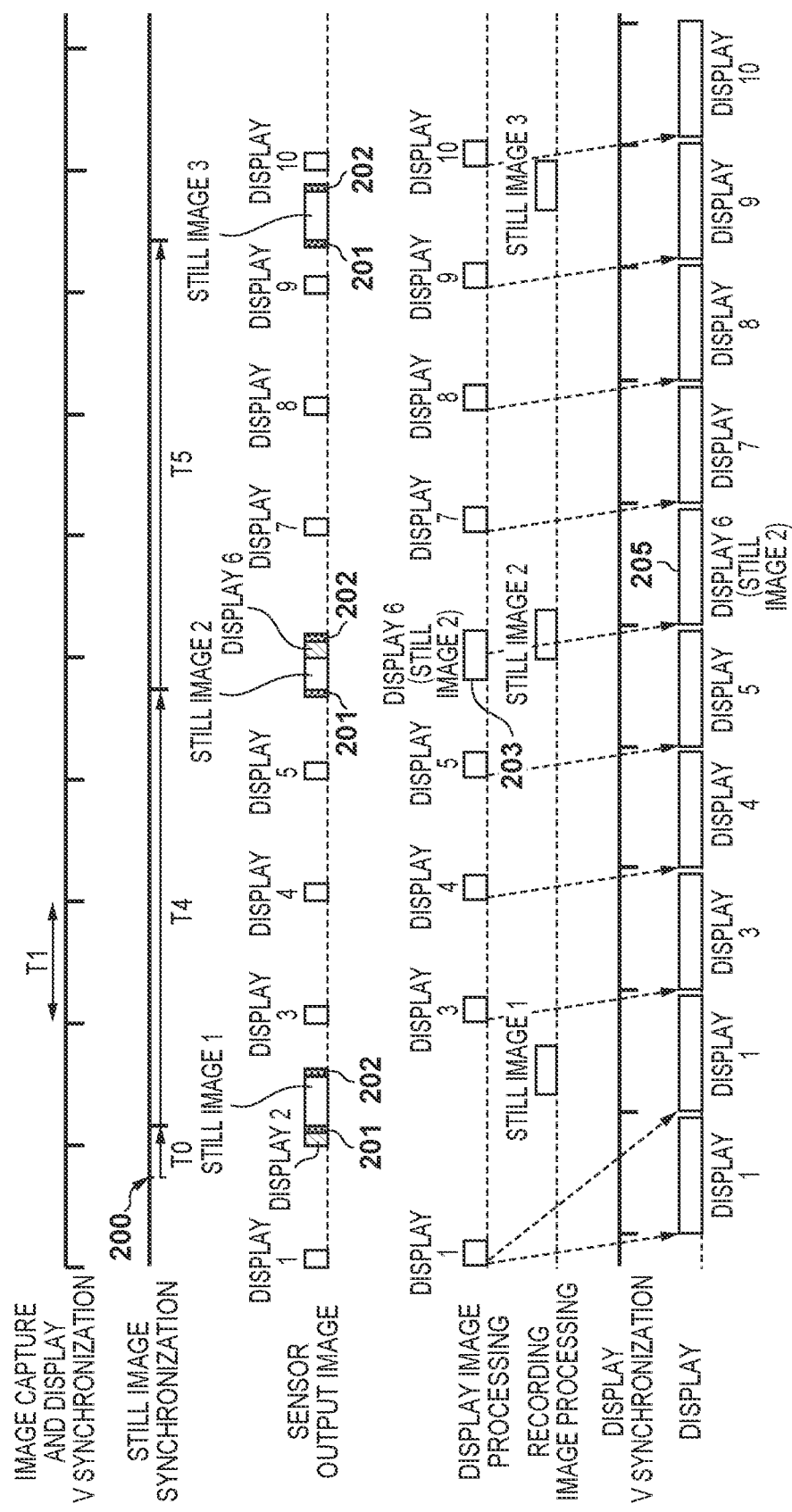

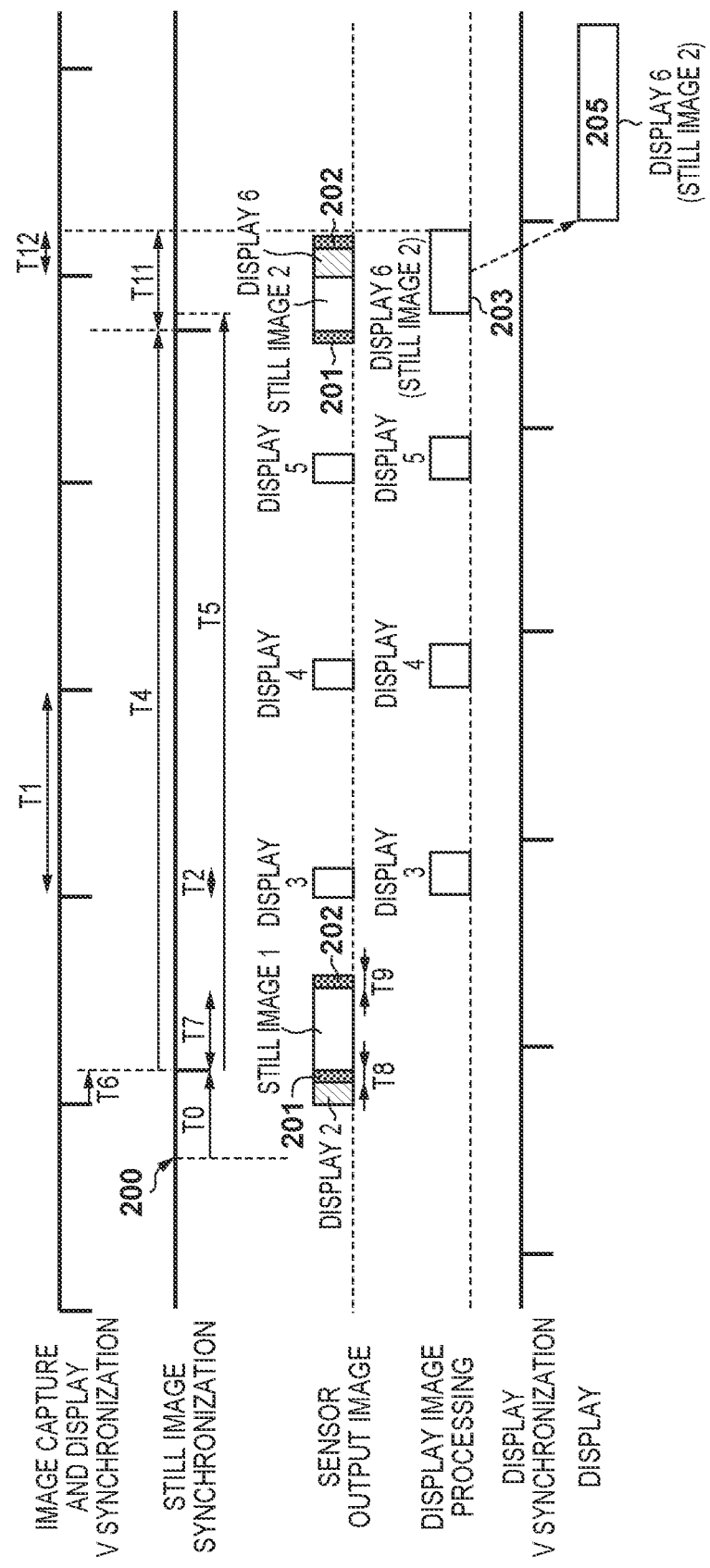

IMAGE CAPTURING APPARATUS AND CONTROL METHOD THEREFOR

BACKGROUND OF THE INVENTION

Field of the Invention

The present invention relates to an image capturing apparatus and a control method therefor, and more particularly to an image capturing apparatus capable of shooting still images during moving image shooting and a control method therefor.

Description of the Related Art

There are digital cameras and electronic devices provided with a camera function (hereinafter, referred to collectively as image capturing apparatuses) that have a live view (LV) function. The LV function causes a display device that displays a moving image to function as a viewfinder, by executing moving image shooting in parallel with display of the moving image obtained by the moving image shooting. The user is able to adjust the shooting range of the moving image and still images to be recorded, using the moving image that is displayed by the LV function.

Generally, since resolution and the like differ between still image data and moving image data, the operations of the image sensor also differ between the time of still image shooting and the time of moving image shooting. In the case of using the same image sensor for moving image shooting and still image shooting, the operations of the image sensor need to be switched according to the type of image being shot. Depending on the timing of still image shooting, moving image shooting may need to be interrupted, in which case adverse effects occur, such as live view display being interrupted and the update frequency of displaying images decreasing.

Japanese Patent Laid-Open No. 2018-038088 discloses a method for outputting the most recent full-resolution frame as a still image, in the case where still image shooting is instructed, while acquiring a moving image by reading out full-resolution frames and lower resolution frames from the image sensor in regular order.

As disclosed in Japanese Patent Laid-Open No. 2018-038088, adverse effects such as moving image shooting being interrupted due to still image shooting and the update frequency of the moving image decreasing can be suppressed, by extracting one frame during moving image shooting as a still image. However, the still image intended by the user may not be obtained, depending on the difference between the timing at which a full-resolution frame was most recently shot and the input timing of the still image shooting instruction. Also, at the time of moving image shooting, two types of readout that differ in resolution need to be implemented while switching therebetween every frame. Thus, there is also a problem in that readout control of the image sensor and processing for generating displaying image data become complicated.

SUMMARY OF THE INVENTION

The present invention has been made in consideration of such problems with the conventional technologies, and, in one aspect thereof, provides an image capturing apparatus capable of achieving both still image shooting at a timing in conformity with the intention of the user and stable moving image display at the time of still image shooting, and a control method therefor.

According to an aspect of the present invention, there is provided an image capturing apparatus comprising: an image sensor; and a control circuit that changes, in a case where a second drive period that is a drive period of the image sensor for still image shooting overlaps with a first drive period that is a drive period of the image sensor for moving image shooting, a start timing of the second drive period, wherein in a case of performing still image shooting while performing moving image shooting and moving image display: if the still image shooting is single image shooting or a first shot of continuous shooting, the control circuit does not change the start timing of the second drive period, and if the still image shooting is a second shot onward of continuous shooting, the control circuit changes the start timing of the second drive period with giving priority to the moving image display.

According to another aspect of the present invention, there is provided a control method for an image capturing apparatus having an image sensor, the method comprising: changing, in a case where a second drive period that is a drive period of the image sensor for still image shooting overlaps with a first drive period that is a drive period of the image sensor for moving image shooting, a start timing of the second drive period, wherein the changing of the start timing of the second drive period includes, in the case of performing still image shooting while performing moving image shooting and moving image display: if the still image shooting is single image shooting or a first shot of continuous shooting, not changing the start timing of the second drive period, and if the still image shooting is a second shot onward of continuous shooting, changing the start timing of the second drive period with giving priority to the moving image display.

According to a further aspect of the present invention, there is provided a non-transitory machine-readable medium storing a program for causing a computer included in an image capturing apparatus that comprises an image sensor to function as: a control unit that changes, in a case where a second drive period that is a drive period of the image sensor for still image shooting overlaps with a first drive period that is a drive period of the image sensor for moving image shooting, a start timing of the second drive period, wherein in a case of performing still image shooting while performing moving image shooting and moving image display: if the still image shooting is single image shooting or a first shot of continuous shooting, the control unit does not change the start timing of the second drive period, and if the still image shooting is a second shot onward of continuous shooting, the control unit changes the start timing of the second drive period with giving priority to the moving image display.

Further features of the present invention will become apparent from the following description of exemplary embodiments (with reference to the attached drawings).

BRIEF DESCRIPTION OF THE DRAWINGS

FIG. 1 is a block diagram showing an example functional configuration of an image capturing apparatus according to an embodiment.

FIG. 2 is a timing chart relating to operations at the time of shooting still images during moving image shooting in the embodiment.

FIG. 4 is a timing chart showing part of FIG. 2.

DESCRIPTION OF THE EMBODIMENTS

Figure 3A:
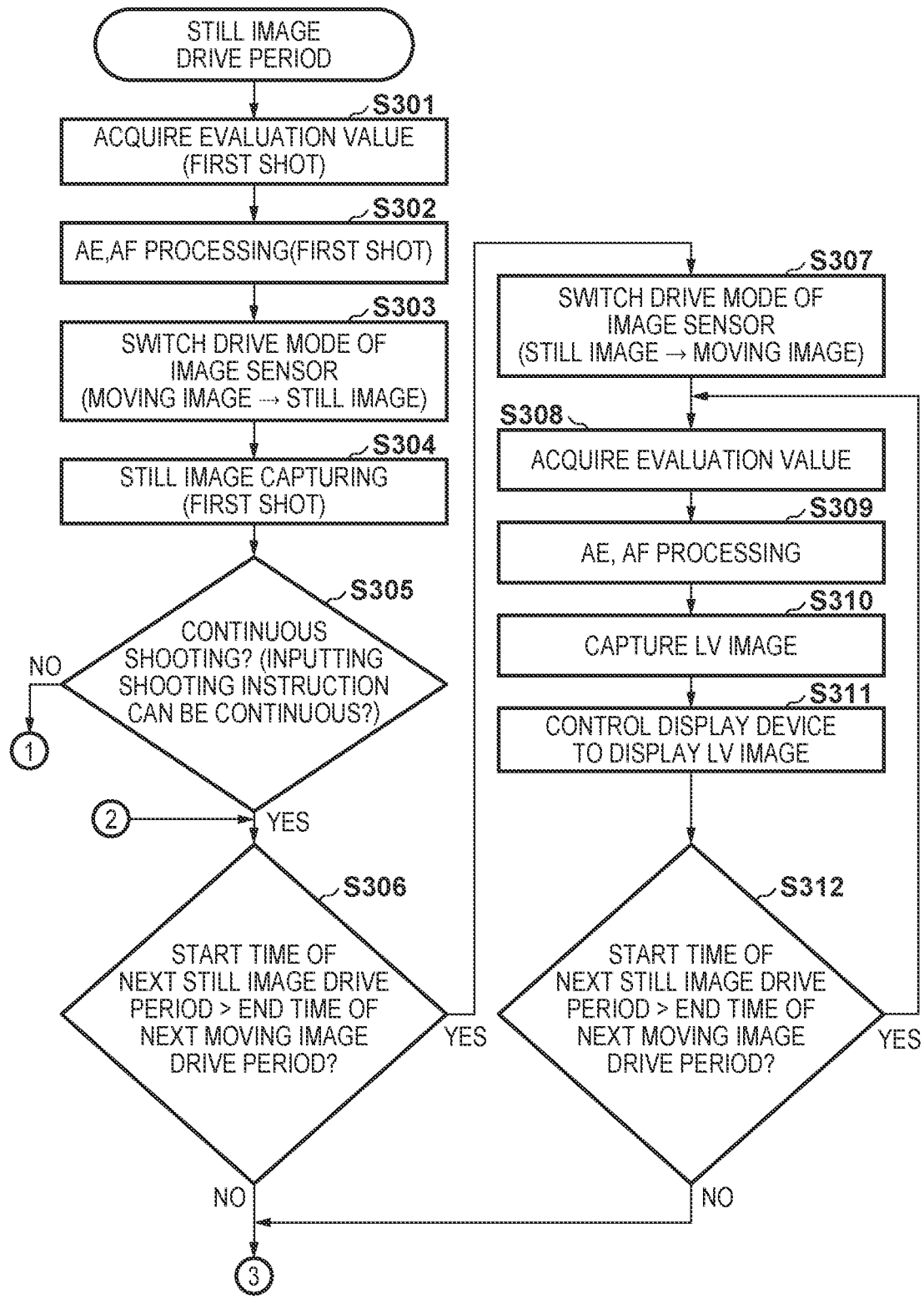
FIGS. 3A and 3B are flowcharts relating to operations at the time of shooting still images during moving image shooting in the embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following embodiments describe examples in which the present invention is applied to an image capturing apparatus such as a digital camera. However, the present invention is applicable to any electronic device having an image capturing function capable of shooting still images during moving image shooting using one image sensor. Such electronic devices include video cameras, computer devices (personal computers, tablet computers, media players, PDAs, etc.), mobile phones, smartphones, game machines, robots, drones, and drive recorders. These are illustrative examples, and the present invention is also applicable to other electronic devices.

FIG. 1 is a block diagram showing an example functional configuration of a digital camera 1 serving as one example of an image capturing apparatus according to the present invention.

An image sensor 100 is a CCD image sensor, a CMOS image sensor or the like, and a plurality of pixels each having a photoelectric conversion region are arrayed. The image sensor 100 converts an optical image that is formed on an image capturing surface by an imaging lens 120 into an electrical signal with the plurality of pixels, and generates image data that is constituted by a plurality of pixel data. Image data generated by the image sensor 100 is written to a transitory storage circuit (buffer memory) 107 via a data transfer circuit 105, and is also supplied to an image reduction circuit 110.

The image reduction circuit 110 reduces the image data that is output by the image sensor 100, and generates reduced image data having a resolution for live view (LV) display. The reduced image data generated by the image reduction circuit 110 is written to the transitory storage circuit 107 via the data transfer circuit 105.

A recording image processing circuit 101 is an image processing block for generating still image data. The recording image processing circuit 101 generates still image data by applying various types of image processing to image data stored in the transitory storage circuit 107. Image processing that is applied to the image data by the recording image processing circuit 101 includes preprocessing, color interpolation processing, correction processing, and data processing. Preprocessing includes noise reduction, signal amplification, reference level adjustment, and defective pixel correction. Color interpolation processing is processing for interpolating the value of color components that are not included in image data read out from the pixels, and is also referred to as demosaic processing. Correction processing includes white balance adjustment, processing for correcting the brightness of images, processing for correcting aberration in the optical system of the imaging lens 120, and processing for correcting color. Data processing includes scaling processing, encoding and decoding processing, and header information generation processing. Note that such image processing is illustrative of image processing that can be implemented by the recording image processing circuit 101, and the present invention is not limited to image processing that is implemented by the recording image processing circuit 101. The recording image processing circuit 101 writes generated still image data to the transitory storage circuit 107.

A displaying image processing circuit 109 generates live view image data by applying various types of image processing to reduced image data generated by the image reduction circuit 110 and written to the transitory storage circuit 107. Basically, the displaying image processing circuit 109 generates live view image data by applying image processing similar to the recording image processing circuit 101 to reduced image data. However, since the live view image is moving image data, and processing needs to be performed on each frame, image processing is applied with a simpler and faster method than the recording image processing circuit 101.

The displaying image processing circuit 109 outputs generated live view image data to the display circuit 102 via the data transfer circuit 105. Note that, in the present embodiment, the image processing circuit for still images and the image processing circuit for display (for moving images) are constituted separately. However, still image data for recording and moving image data for live view display may be generated using one image processing circuit. For example, moving image data and still image data may be generated by one image processing circuit, by performing processing for generating still image data in time periods during which processing for generating the live view image is not being performed.

Note that the displaying image processing circuit 109 may apply detection processing and evaluation value calculation processing to reduced image data or generated live view image data. Detection processing involves detection of a feature region (e.g., face region, body region) and motion thereof, human recognition processing, and the like. Also, evaluation value calculation processing is processing for calculating evaluation values to be used by a control circuit 104, such as a pair of image signals for phase difference AF (auto focus detection), evaluation values for contrast AF, and evaluation values to be used in auto exposure control (AE).

A display circuit 102 receives live view image data from the transitory storage circuit 107 via the data transfer circuit 105. The display circuit 102 applies processing for performing display on a display device 103 to live view image data if necessary. This processing includes edge processing (letterbox processing, etc.) that is performed in the case where the aspect ratios of the display screen of the display device and the live view image differ, for example. Also, this processing includes processing for compositing supplementary information such as shooting time, composition of GUI images such as OSD images, and signal format conversion.

The display circuit 102 outputs live view image data to which required processing has been applied to the display device 103. The display device 103 is an LCD (Liquid Crystal Display) or an OLED (Organic Light Emitting Diode) display, for example. The display device 103 which displays live view image data (moving image data) functions as an electronic viewfinder (EVF).

A shooting instruction unit 111 is an input device for the user to give a still image shooting instruction to the digital camera 1. The shooting instruction unit 111 may be a release button provided in the digital camera 1 or may be another input device such as a remote control. User instructions given through the shooting instruction unit 111 are detected by the control circuit 104.

The control unit 104 has a CPU, and loads and executes programs stored in a ROM 113 on a RAM 112, for example. Note that an FPGA (field-programmable gate array) which is a programmable processor may be used instead of the CPU. The control unit 104 realizes functions of the digital camera 1, by controlling operations of the functional blocks. The ROM 113 is a rewritable nonvolatile memory, for example, and stores programs executable by the CPU of the control unit 104, setting values, GUI data, and the like. The RAM 112 is used for loading programs to be executed by the CPU of the control unit 104, and saving values required during execution of programs. The control unit 104 also controls the readout operation from the image sensor 100 which will be discussed later.

The data transfer circuit 105 is constituted by a plurality of DMA (Direct Memory Access) controllers (DMAC), for example. Various types of image data are temporarily stored in the transitory storage circuit 107 by the DMACs via a bus 106. Also, image data stored in the transitory storage circuit 107 is read out to the bus 106 by the DMACs, and supplied to units that are connected to the data transfer circuit 105.

The bus 106 has a system bus and a data bus that are independent, for example. Bidirectional communication is possible between functional blocks connected to the bus 106.

The transitory storage circuit 107 is constituted by a memory control circuit and a memory, and functions to write data to the memory and to read out and output data from the memory, according to instructions of the control unit 104 or the data transfer circuit 105. The transitory storage circuit 107 is also used as a buffer for moving image data and still image data.

A recording circuit 108 records still image data and moving image data for recording generated by the recording image processing circuit 101 to a recording medium such as a memory card under the control of the control unit 104. Also, the recording circuit 108 reads out and outputs image data recorded on the recording medium, under the control of the control unit 104. The control unit 104 stores read image data in the transitory storage circuit 107.

FIG. 2 is a diagram schematically showing timing control of shooting and display operations in the case of performing still image shooting while performing live view (LV) display (moving image display). The horizontal axis is a time axis, with time progressing from left to right in the diagram. Here, the case of continuous shooting in which the still image shooting instruction is continuously input is shown.

Image capture and display V synchronization indicates the output timing of a vertical synchronization signal indicating the timing at which LV image exposure and data readout start from the image sensor 100. The vertical synchronization signal is output in a period T1 that depends on the frame rate of the LV image (moving image).

Still image synchronization is a signal indicating the timing at which still image data is read out by the image sensor 100. The control unit 104 generates a still image synchronization signal at a predetermined timing, while the still image shooting instruction is being input from the shooting instruction unit 111. In the present embodiment, when the still image shooting instruction is initially detected, the control unit 104 outputs the still image synchronization signal after a given length of time (release time lag). Thereafter, in the case where the still image shooting instruction is continuously input, the control unit 104 outputs the still image synchronization signal at a fundamental period determined in advance. As will be discussed later, the output period of the still image synchronization signal from the second time onward may, however, be changed from the fundamental period according to the timing of the moving image shooting for LV display. In FIG. 2, T5 indicates the fundamental period and T4 indicates a changed period.

Sensor output image indicates the time period during which image capture and readout of image data (LV image data, still image data) are performed in the image sensor 100, and the time period (readout mode drive switching time period) during which LV image (moving image) readout and still image readout are switched. Display 1 to display 10 indicate the image capture and readout time period (moving image drive period or first drive period) of the LV image, and still image 1 to still image 3 indicate the image capture and readout time period (still image drive period or second drive period) of still images. Also, reference signs 201 and 202 denote a drive mode drive switching time period of the image sensor 100. Reference sign 201 denotes the drive switching time period from a drive mode (moving image mode) for LV image (moving image) acquisition to a drive mode (still image mode) for still image acquisition, and reference sign 202 denotes the drive switching time period from the still image mode to the moving image mode. Switching of the drive mode of the image sensor 100 is performed by the control unit 104 changing the settings of the image sensor 100, for example.

The resolution and exposure time differ between the LV image, which is a moving image for display, and still images for recording. In particular, since the resolution of the LV image is lower than the resolution of still image data, the amount of image data to be read out is smaller. Thus, the moving image drive period is shorter than the still image drive period. Note that since readout of LV image data is not actually performed in the moving image drive period indicated by displays 2 and 6 out of display 1 to display 6, these periods are shaded.

Displaying image processing indicates the image processing time period in the displaying image processing circuit 109. Displays 1, 3, 4, 5, 7, 8, 9 and 10 and still image 2 indicate sensor output images to be processed. The image processing time period is the time period from when image data read out from the image sensor 100 is supplied to the displaying image processing circuit 109 via the transitory storage circuit 107 until when this data is again stored in the transitory storage circuit 107 after image processing.

Note that, in relation to the LV image, supply to the displaying image processing circuit 109 is started without waiting for one screen of image data to all be stored in the transitory storage circuit 107. Note that the data transfer circuit 105 only supplies image data stored in the transitory storage circuit 107 to the displaying image processing circuit 109 or the recording image processing circuit 101. Image data is not supplied to the displaying image processing circuit 109 or the recording image processing circuit 101 without being stored in the transitory storage circuit 107.

Display 6 denoted by reference sign 203 is generated based on still image 2. More specifically, apart from still image data read out from the image sensor 100 in the time period of still image 2 being stored in the transitory storage circuit 107 at the original resolution, reduced images reduced by the image reduction circuit 110 are also stored in the transitory storage circuit 107. Reduced image data is supplied to the displaying image processing circuit 109, and the live view image corresponding to display 6 is generated.

Note that, in the case of generating live view image data from still image data, image reduction may be performed by the displaying image processing circuit 109 rather than by the image reduction circuit 110. In this case, only still image data is stored in the transitory storage circuit 107, and the still image data is also shared with the displaying image processing circuit 109. Note that the time period of display 6 is long in the displaying image processing because the time required for readout of still image data is longer than for readout of moving image data.

Recording image processing indicates the image processing time period in the recording image processing circuit 101. Still images 1, 2 and 3 indicate sensor output images to be processed. The image processing time period is the time period from when image data read out from the image sensor 100 is supplied to the displaying image processing circuit 109 via the transitory storage circuit 107 until when this data is again stored in the transitory storage circuit 107 after image processing.

In relation to still images, supply to the recording image processing circuit 101 is started after one screen of still image data read out from the image sensor 100 has all been stored in the transitory storage circuit 107. This is not essential, however, and the storage operation from the image sensor 100 to the transitory storage circuit 107 may be implemented in parallel with the supply operation from the transitory storage circuit 107 to the recording image processing circuit 101, similarly to the live view image.

Display V synchronization is a vertical synchronization signal of the display device 103. Note that the real-time qualities of live view display improve, by shortening the delay of display V synchronization with respect to image capture and display V synchronization.

Display indicates the display time period in the display device 103 and the images that are displayed. Note that the initial two frames are both the image of display 1 because live view image data corresponding to display 2 is not generated in the displaying image processing. Also, display 6 (still image 2) indicates that the sixth frame of the live view image is generated based on still image 2.

In the present embodiment, when input is detected in a state where the still image shooting instruction has not been input, still image shooting is implemented without extending a release time lag T0 determined in advance. Still image shooting is prioritized, even in the case where the still image drive period that starts after the release time lag T0 overlaps with the moving image drive period. Accordingly, in single image shooting or the first shot of continuous shooting, the release time lag is always T0, and shooting at the timing intended by the user can be realized.

Thereafter, when input of the shooting instruction is continuously detected, the control unit 104 judges this to be continuous shooting. The control unit 104 then schedules the timing of the next still image shooting in accordance with a fundamental period T5 determined in advance. In the case where the still image drive period decided in accordance with the fundamental period T5 overlaps with the moving image drive period, the control unit 104 adjusts the start timing of still image shooting such that the live view image that is generated from the still image meets the update timing of the live view image. In this way, in relation to still image shooting from the second shot of continuous shooting onward, the shooting timing is adjusted due to prioritizing display of the live view image at a given update frequency.

Figure 3B:
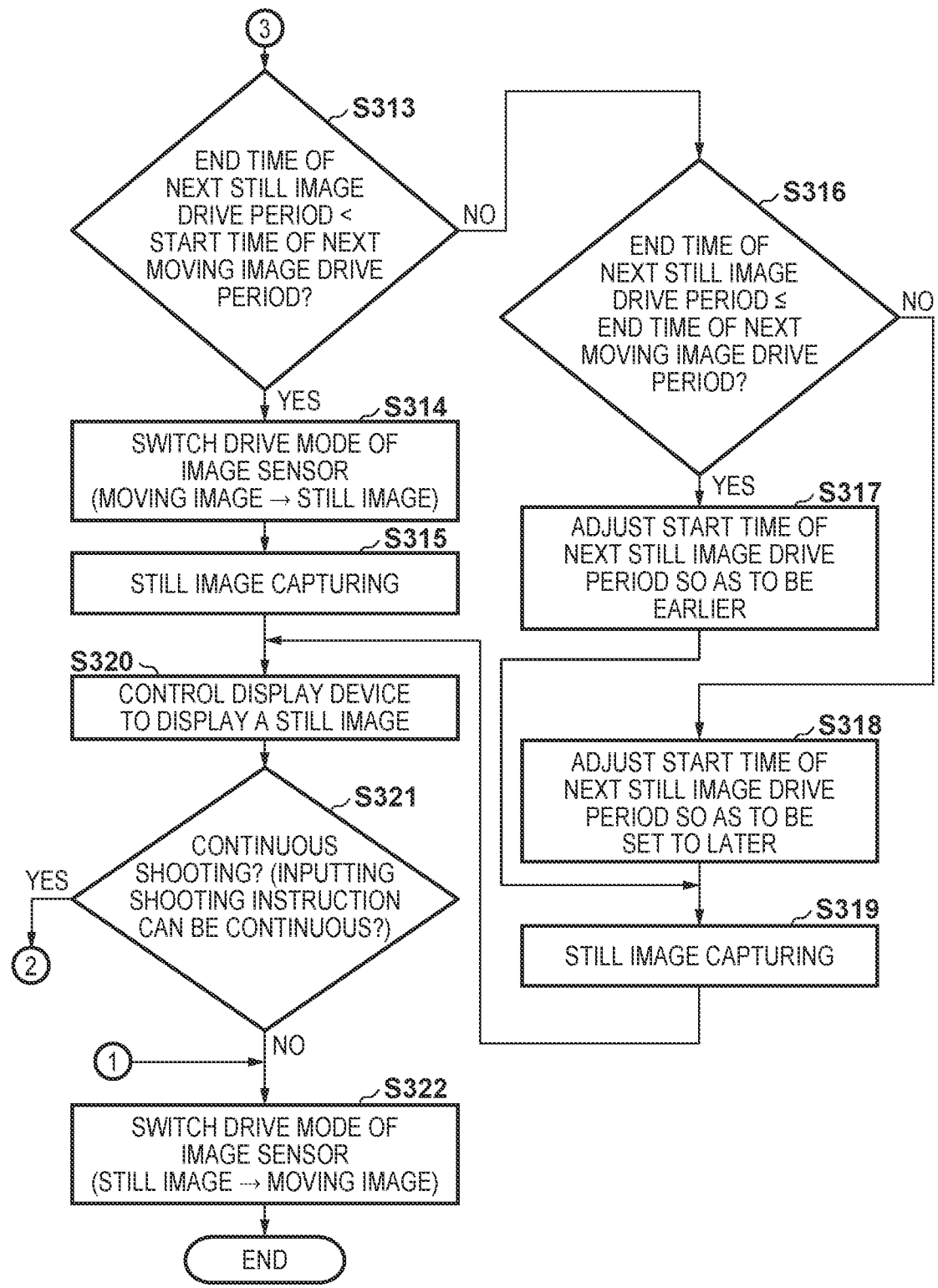

FIGS. 3A and 3B are flowcharts relating to operations of the control unit 104 for performing control as shown in the timing chart of FIG. 2. The control unit 104 executes the operations shown in this flowchart in response to input of the still image shooting instruction through the shooting instruction unit 111 being detected during live view display.

In step S301, the control unit 104 executes auto exposure (AE) and auto focus detection (AF) processing that uses the evaluation values generated by the displaying image processing circuit 109 based on live view image data. The control unit 104 decides the exposure conditions at the time of still image shooting by AE processing. Also, the control unit 104 focuses the imaging lens 120 on a focus detection area by AF processing.

In step S302, the control unit 104 sets the exposure conditions decided in step S301 in drive control circuits of the diaphragm and the shutter. Note that, in the case where a shooting preparation instruction is input prior to the shooting instruction, the processing of steps S301 and S302 may be executed when input of the shooting preparation instruction is detected.

In step S303, the control unit 104 switches the drive mode of the image sensor 100 from the moving image mode to the still image mode. The time period required for this drive mode switching corresponds to the time period 201 in FIG. 2. Note that, given that switching of the drive mode is executed during the moving image drive period of display 2 that is implemented in parallel, the control unit 104 decides to stop generation of the LV image corresponding to display 2 and repeatedly display the LV image of the previous frame (i.e., display 1).

In step S304, the control unit 104 executes still image shooting processing of the first shot in accordance with the exposure conditions derived in step S303, after the release time lag T0 from input of the shooting instruction. The still image data obtained by shooting is processed by the recording image processing circuit 101 and temporarily stored in the transitory storage circuit 107, as described above.

In step S305, the control unit 104 determines whether the still image shooting is continuous shooting. If the shooting instruction that was first input at 200 (FIG. 2) is being continuously input, the control unit 104 determines that the still image shooting is to be continuously executed (continuous shooting), and advances the processing to step S306. On the other hand, if the shooting instruction has stopped being input at the time of step S305, the control unit 104 determines that the still image shooting is single image shooting, and advances the processing to step S322 (FIG. 3B).

In step S306, the control unit 104 determines whether moving image shooting is possible before the next still image drive period that is based on the fundamental period T5. Specifically, the control unit 104 determines that moving image shooting is possible if the end time of the next moving image drive period is earlier than the start time of the next still image drive period, and advances the processing to step S307 if the end time of the next moving image drive period is determined to be earlier, and advances the processing to step S313 (FIG. 3B) if the end time of the next moving image drive period is not determined to be earlier.

FIG. 4 extracts the time period from the beginning of the timing chart in FIG. 2 until when the LV image of display 6 is displayed. Here, T0 is the release time lag, T1 is the period of the moving image drive period (frame period), T2 is the length of the moving image drive period, and T6 is the length of time from the initial display V synchronization signal after the input time of the shooting instruction until the still image synchronization signal. Also, T5 is the fundamental period at the time of still image continuous shooting, and T7 is the length of the still image drive period. The start and end times of the drive period with the input time of the shooting instruction as the starting point can be written as follows, where m and n are respectively the moving image frame number and the still image frame number of sensor output images after the input time of the shooting instruction (m and n being integers of 2 or more).

Start time of moving image drive period (display m) of frame number m: (T0−T6)+mT1
End time of moving image drive period (display m) of frame number m: (T0−T6)+mT1+T2
Start time of still image drive period (still image n) of frame number n: T0+nT5
End time of still image drive period (still image n) of frame number n: T0+nT5+T7

Accordingly, the control unit 104 is able to perform the determination of step S306 by whether the following Formula 1 is satisfied with regard to the next frame numbers m and n.

$$nT5 > mT1 - T6 + T2 \quad (1)$$

Note that the fundamental period T5 corresponding to the shooting interval at the time of continuous shooting may be settable by the user.

In step S307, the control unit 104 switches the drive mode of the image sensor 100 from the still image mode to the moving image mode.

In step S308, the control unit 104 acquires the evaluation value generated by the displaying image processing circuit 109 for the LV image shot most recently, for example. Note that in the case where the image shot most recently is a still image, the control unit 104 may generate the evaluation value based on the still image data.

In step S309, the control unit 104 decides the exposure value of the next moving image shooting based on the evaluation value acquired in step S308, and also adjusts the focus position of the imaging lens if necessary.

In step S310, the control unit 104 controls the exposure time period of the image sensor 100 and the diaphragm, in accordance with the exposure conditions decided in step S308, and captures an LV image.

In step S311, the control unit 104 controls the display device 103 to perform display via the display circuit 102, after controlling the displaying image processing circuit 109 to perform image processing on the LV image data.

In step S312, the control unit 104 performs a similar determination to step S306, and determines whether further moving image shooting is possible before the next still image drive period. If moving image shooting is determined to be possible, the processing is executed again from step S308, and if moving image shooting is not determined to be possible, the processing is advanced to step S313 (FIG. 3B). In the example shown in FIG. 4, until the moving image drive period of display 5 is performed, the control unit 104 repeatedly executes the processing from steps S308 to S312.

In step S313, the control unit 104 determines whether the next still image drive period that is based on the fundamental period T5 overlaps with the next moving image drive period. Specifically, first, in step S313, the control unit 104 determines whether the end time of the next still image drive period is earlier than the start time of the next moving image drive period, and advances the processing to step S314 if the end time of the next still image drive period is determined to be earlier, and advances the processing to step S316 if the end time of the next still image drive period is not determined to be earlier. In the example shown in FIG. 4, the control unit 104 is able to perform the determination of step S313 by whether the following Formula 2 is satisfied with regard to the next frame numbers m and n.

$$nT5 + T7 < mT1 - T6 \quad (2)$$

Step S314 is executed in the case where the next still image drive period that is based on the fundamental period T5 ends earlier than the next moving image drive period. In this case, since the next still image drive period that is based on the fundamental period T5 does not overlap with the next moving image drive period, the start timing of the still image drive period does not need to be adjusted. Accordingly, the control unit 104 switches the drive mode of the image sensor 100 from the moving image mode to the still image mode.

In step S315, the control unit 104 executes processing for capturing a still image, and advances the processing to step S320. Here, in shooting from the second shot of continuous shooting onward, the exposure conditions and focus distance of the first shot are used. However, in the case of also adjusting the exposure conditions and focus distance for the second shot onward, processing similar to steps S301 and S302 can be performed.

In step S316, the control unit 104 determines whether the end time of the next still image drive period that is based on the fundamental period T5 is the same as or earlier than the end time of the next moving image drive period. The control unit 104 advances the processing to step S317 if the end time of the next still image drive period is determined to be the same or earlier, and advances the processing to step S318 if the end time of the next still image drive period is not determined to be the same or earlier.

Figure 5:
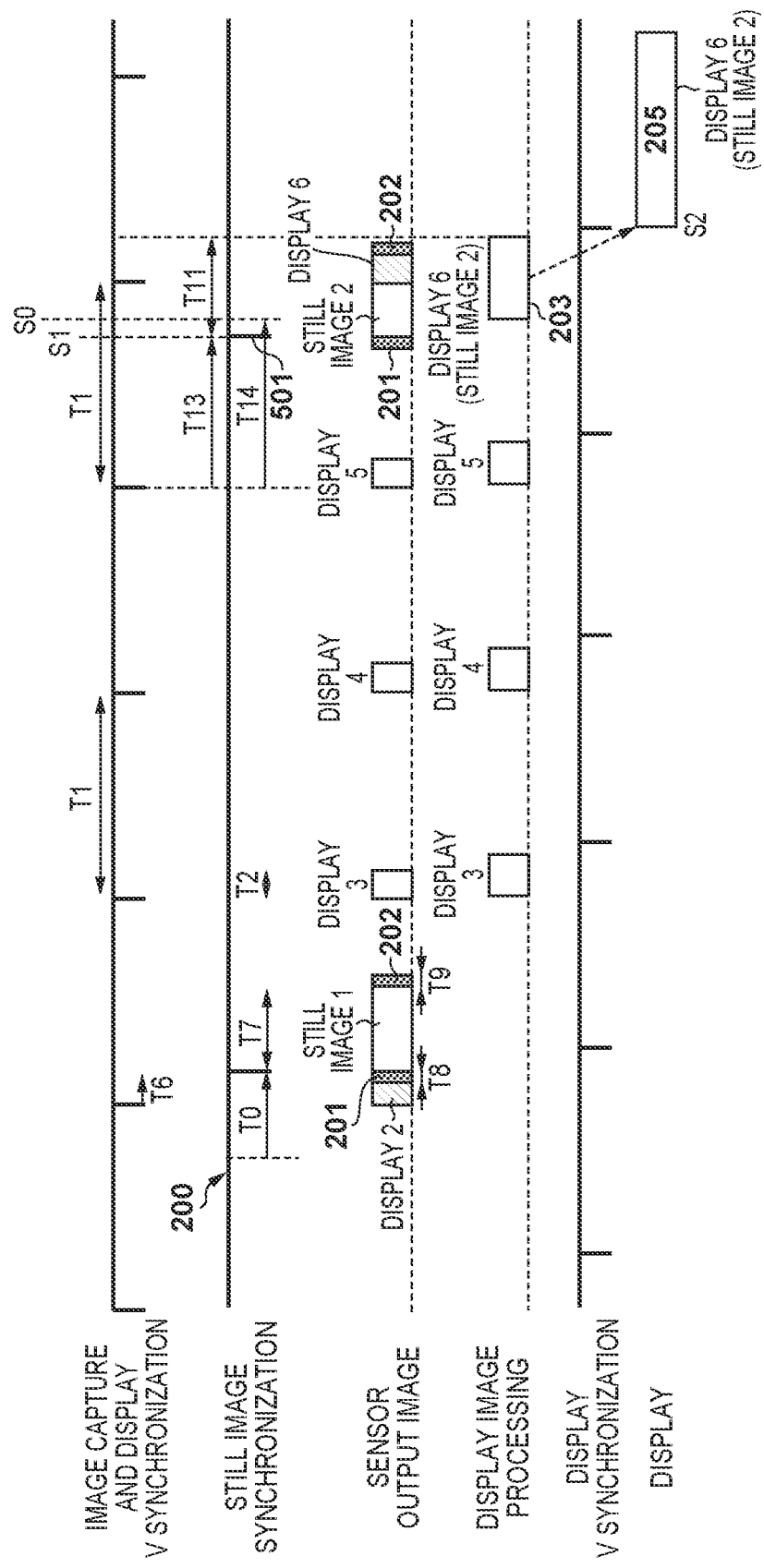
FIG. 5 is a timing chart showing part of FIG. 2.

FIG. 5 extracts the time period from the beginning of the timing chart in FIG. 2 until when the LV image of display 6 is displayed. In this case, the control unit 104 is able to perform the determination of step S316 by whether the following Formula 3 is satisfied.

$$nT5 + T7 \leq mT1 - T6 + T2 \quad (3)$$

Alternatively, in the case where step S316 is executed at the start time of the moving image drive period of display 5, for example, the control unit 104 is able to perform the determination of step S316 by whether the following Formula 3' is satisfied, where T14 is the length of time from the immediately previous display V synchronization signal until the next still image synchronization signal.

$$T1 \geq T14 \quad (3')$$

In the case where Formula 3 is satisfied, the LV image corresponding to the moving image drive period that the still image drive period overlaps with is generated based on a still image. Generating the LV image from a still image takes longer than generating the LV image from a moving image frame. Thus, the still image drive period is moved forward (start time is set to earlier), such that generation of the LV image meets the update timing.

In step S317, the control unit 104 adjusts the start time of the next still image drive period so as to be earlier. Specifically, the control unit 104 adjusts the start time of the next still image drive period, such that the displaying image generation processing (203 in FIG. 5) for generating the LV image from still image data that is obtained in the next still image drive period is completed before the display V synchronization for displaying the generated LV image. The still image drive period need only be adjusted to start at least TA+TB before the time of the display V synchronization that is targeted, where TA is the length of time from the start of still image data readout until when the displaying image generation processing is started, and TB is the length of time required for the displaying image generation processing. TA and TB can both be derived in advance. The length of time required for reduction is included in TA in the case where reduction is performed with the image reduction circuit 110, and in TB in the case where reduction is performed with the displaying image processing circuit 109. Accordingly, the control unit 104 adjusts the start time of the next still image drive period that is based on the fundamental period T5 to be at least TA+TB before the time of the display V synchronization for displaying the LV image that is based on still image data.

For example, in the case of the example in FIG. 5, T11 corresponds to the above-mentioned TA+TB. Accordingly, the control unit 104 need only adjust a start time S1 of the next still image drive period (still image 2) to be at least TA+TB earlier than the time S2 of the display V synchronization that is targeted. In the case where the image capture and display V period synchronization of display 5 is taken as the starting point, the next still image drive period (still image 2) is adjusted so as to start at time S1 which is T13 after the starting point, whereas this time period starts at time S0 which is T14 after the starting point when based on the fundamental period.

In the case where Formula 3 is not satisfied, the moving image drive period and the still image drive period are prevented from overlapping, by moving the still image drive period back (setting the start time to later). Although the still image shooting timing will be slightly later than the timing that is determined by the fundamental period T5, generation of the LV image can thereby be performed as per normal.

In step S318, the control unit 104 adjusts the start time of the next still image drive period so as to be set to later. Specifically, the control unit 104 adjusts the start time of the next still image drive period so as to be after the end of the next moving image drive period. The drive mode of the image sensor needs to be changed before the still image drive period. Thus, the control unit 104 adjusts the start time of the next still image drive period to a time after the moving image drive period has ended and the mode drive switching time period has elapsed. Note that the start time is decided such that the still image drive period after adjustment does not overlap with the moving image drive period. To minimize the delay from the start time determined by the fundamental period T5, the start time after adjustment is set to a time at which the mode drive switching time period has elapsed from the end time of the next moving image drive period. For example, in FIG. 5, in the case of implementing step S318 at the start time of the moving image drive period (display 5), the control unit 104 sets the start time S1 after adjustment to a time after T1+T2+T8 has elapsed.

In step S319, the control unit 104 executes processing for capturing a still image, and advances the processing to step S320.

In step S320, the control unit 104 controls the display device 103 to display a reduced image of still image data generated by the recording image processing circuit 101.

In step S321, the control unit 104 determines whether the still image shooting is continuous shooting, similarly to step S305. If the shooting instruction is being continuously input, the control unit 104 determines that the still image shooting is to be continuously executed (continuous shooting), and returns the processing to step S306. On the other hand, if the shooting instruction has stopped being input, the control unit 104 determines that continuous shooting of the still image shooting has ended, and advances the processing to step S322.

In step S322, the control unit 104 switches the drive mode of the image sensor 100 from the still image mode to the moving image mode, and ends the still image shooting processing.

As described above, according to the present embodiment, in the case of shooting still images during shooting of a moving image such as a live view image, a given release time lag can be set with regard to the still image shooting being single image shooting or the first shot of continuous shooting. Thus, still image shooting at the timing intended by the user will be possible. On the other hand, in the case where the still image shooting is continuous shooting, the timing of the still image shooting is changed such that updating of moving image data is prioritized from the second shot onward. Thus, stable display of a moving image even during still image shooting becomes possible, without display of the moving image being interrupted or the update frequency of the moving image decreasing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088569, filed on May 8, 2019, which is hereby incorporated by reference herein in its entirety.

What is claimed is:

1. An image capturing apparatus comprising:
an image sensor that is capable of capturing a moving image and a still image; and
a control circuit that controls the image sensor, wherein when capturing a moving image for live view display, the control circuit controls the image sensor to have a moving image drive period with a first cycle determined by a framerate of the live view display, and when continuously capturing still images, the control circuit controls the image sensor to have a first still image drive period starts after a fixed time period is elapsed from an instruction of still image shooting and a second and later still image drive periods with a second cycle, wherein when continuously capturing the still images while capturing the moving picture, in case where the first still image drive period overlaps with any of the moving picture drive periods, the control circuit controls the image sensor to have the first still image drive period and not to have the overlapped moving picture drive period, in case where any one of the second and later still image drive periods overlaps with any of the moving picture drive periods, the control circuit controls the image sensor so that the overlapping still image drive period to start from a timing based on the first cycle rather than the second cycle.

2. The image capturing apparatus according to claim 1, wherein when continuously capturing the still images while capturing the moving picture, wherein in case where any one of the second and later still image drive periods overlaps with any of the moving picture drive periods and the overlapping still image drive period ends before an end of the overlapped moving image drive period, the control circuit controls the image sensor so that the overlapping still image drive period to start from a timing based on the first cycle preceding its original start timing based on the second cycle.

3. The image capturing apparatus according to claim 2, wherein the control circuit controls the image sensor so that the overlapping still image drive period to start from a timing based on the first cycle preceding its original start timing based on the second cycle so that a still image obtained from the overlapping still image drive period can be used for a frame image for live view display.

4. The image capturing apparatus according to claim 1, wherein when continuously capturing the still images while capturing the moving picture, wherein in case where any one of the second and later still image drive periods overlaps with any of the moving picture drive periods and the overlapping still image drive period ends after an end of the overlapped moving image drive period, the control circuit controls the image sensor so that the overlapping still image drive period to start from a timing based on the first cycle that is after its original start timing based on the second cycle.

5. The image capturing apparatus according to claim 4, wherein the control circuit controls the image sensor so that the overlapping still image drive period to start from a timing that is based on the first cycle and is after its original start timing based on the second cycle, so that the overlapping still image drive period no longer overlaps any of the moving image drive periods.

6. The image capturing apparatus according to claim 1, wherein the second cycle can be set by a user.

7. A control method for an image capturing apparatus having an image sensor that is capable of capturing a moving image and a still image, the method comprising:

when capturing a moving image for live view display, controlling the image sensor to have a moving image drive period with a first cycle determined by a framerate of the live view display, and when continuously capturing still images, and controlling the image sensor to have a first still image drive period starts after a fixed time period is elapsed from an instruction of still image shooting and a second and later still image drive periods with a second cycle, wherein when continuously capturing the still images while capturing the moving picture, in case where the first still image drive period overlaps with any of the moving picture drive periods, controlling the image sensor to have the first still image drive period and not to have the overlapped moving picture drive period, in case where any one of the second and later still image drive periods overlaps with any of the moving picture drive periods, controlling the image sensor so that the overlapping still image drive period to start from a timing based on the first cycle rather than the second cycle.

8. A non-transitory machine-readable medium storing a program for causing a computer included in an image capturing apparatus that comprises an image sensor that is capable of capturing a moving image and a still image to function as:

a control unit that controls the image sensor, wherein when capturing a moving image for live view display, the control unit controls the image sensor to have a moving image drive period with a first cycle determined by a framerate of the live view display, and when continuously capturing still images, the control unit controls the image sensor to have a first still image drive period starts after a fixed time period is elapsed from an instruction of still image shooting and a second and later still image drive periods with a second cycle, wherein when continuously capturing the still images while capturing the moving picture, in case where the first still image drive period overlaps with any of the moving picture drive periods, the control unit controls the image sensor to have the first still image drive period and not to have the overlapped moving picture drive period, in case where any one of the second and later still image drive periods overlaps with any of the moving picture drive periods, the control unit controls the image sensor so that the overlapping still image drive period to start from a timing based on the first cycle rather than the second cycle.

9. An image capturing apparatus comprising:

an image sensor;

a control circuit that controls driving of the image sensor; and a display image processing circuit that generates an image to be displayed on a display device, using image data generated by the image sensor, wherein when the control circuit causes the image sensor to continuously capture still images while capturing moving images for live view display, the display image processing circuit uses data of the moving images and a second and later still images of the continuously captured still images for generating images for live view display on the display device, and does not use data of a first still image of the continuously captured still images.

10. The image capturing apparatus according to claim 9, wherein
when the control circuit causes the image sensor to continuously capture still images while capturing moving images for live view display, the control circuit controls the image sensor to perform moving image drives with a first cycle determined by a framerate of the live view display, and the control circuit controls the image sensor to perform a first still image drive after a fixed time period is elapsed from an instruction of still image shooting and perform a second and later still image drives with a second cycle.

11. The image capturing apparatus according to claim 10, wherein
when the control circuit causes the image sensor to continuously capture still images while capturing moving images for live view display,
in case where any one of driving periods of the image sensor for obtain the second and later still images overlaps with any of driving periods of the image sensor for obtain the moving picture and the overlapping drive period ends before an end of the overlapped drive period,
the display image processing circuit uses one of the second and later still images for generating images for live view display on the display device.

12. A control method for an image capturing apparatus having an image sensor, the method comprising:
generating an image to be displayed on a display device, using image data generated by the image sensor,
when the image sensor continuously captures still images while capturing moving images for live view display,
the generating uses data of the moving images and a second and later still images of the continuously captured still images for generating images for live view display on the display device, and does not use data of a first still image of the continuously captured still images.

13. A non-transitory machine-readable medium storing a program for causing a computer included in an image capturing apparatus that comprises an image sensor to function as:
a control unit that controls driving of the image sensor; and
a display image processing unit that generates an image to be displayed on a display device, using image data generated by the image sensor,
wherein when the control unit causes the image sensor to continuously capture still images while capturing moving images for live view display,
the display image processing unit uses data of the moving images and a second and later still images of the continuously captured still images for generating images for live view display on the display device, and does not use data of a first still image of the continuously captured still images.

* * * * *